United States Patent [19]
Schneider

[11] 3,918,193
[45] Nov. 11, 1975

[54] FISHING FLOAT AND METHOD OF ASSEMBLY

[76] Inventor: Vernon J. Schneider, Licking Pike, Sun Valley, Alexandria, Ky. 41001

[22] Filed: July 25, 1974

[21] Appl. No.: 491,741

[52] U.S. Cl.............................. 43/43.1; 43/44.94
[51] Int. Cl.² ........................................ A01K 93/00
[58] Field of Search............ 43/44.93, 44.94, 43.1, 43/44.9, 44.87, 44.88

[56] References Cited
UNITED STATES PATENTS

| | | | |
|---|---|---|---|
| 657,407 | 9/1900 | Gibson | 43/43.1 |
| 2,203,252 | 6/1940 | Borneman | 43/44.9 |
| 3,461,596 | 8/1969 | Green | 43/43.1 |

*Primary Examiner*—Warner H. Camp
*Attorney, Agent, or Firm*—John G. Schenk

[57] ABSTRACT

The construction of the fishing float is such that the float body is precisely positioned on the stem or shaft. The stem is provided with a uniform diameter portion, one end of this portion tapers outwardly and terminates at a shoulder. The float is provided with a bore having an internal diameter greater than the uniform portion of the stem but less than the outermost tapered diameter end. The fishing float is quickly assembled by inserting the stem through the float and relatively moving the float to engage the shoulder portion of the stem. The float may be fixedly secured thereto by dipping the float and stem in a suitable material.

5 Claims, 4 Drawing Figures

FISHING FLOAT AND METHOD OF ASSEMBLY

BACKGROUND OF THE INVENTION

This invention relates generally to fishing floats and more particularly to a fishing float having a precisely positioned float member placed on the stem.

There is a multitude of various fishing floats available for the fisherman today. These floats range in scope from relatively complicated structures as exemplified by United States patents to Seymour U.S. Pat. No. 3,159,941 and Lambach, U.S. Pat. No. Re. 26,096, to the rather uncomplicated and simple type bobbers exemplified by Kercher U.S. Pat. No. 2,863,254. The Kercher style bobber in its most simplified form comprises a float member fastened upon a stem. In the past, there has been no precise positioning of the float upon the stem. In most instances, the float or bobber portion can be moved relative to the stem. In some instances, detents on either of the stem or float will engage the other member so as to provide a friction type fit. However, this still does not provide a precise positioning of the float to the stem. In other cases, the bore through the float is tapered and the members are moved relative to one another until a tight fit is obtained. In addition, the stem may be tapered while the bore of the float is cylindrical resulting in the same type friction tight fit. None of these methods of securing the float to the stem provides a precise positioning of one member relative to the other. In the instances where the float is initially positioned upon the stem in a precise location, use of the float would often loosen the members such that the float member would have to be pushed further along the stem to once again secure the tight fit.

Accordingly, it is an object of this invention to provide a fishing float which is of simple and economical construction and which provides for the precise positioning of the float member relative to the stem.

Another object of this invention is to provide a fishing float which prevents the movement of the float member along the stem past the precise positioning point.

A still further object of this invention is to provide a fishing float which may be precisely and easily assembled.

SUMMARY OF THE INVENTION

A fishing float is provided in which the float member is precisely positioned on the stem. The float body is formed with a constant diameter bore extending therethrough. A taper upon the stem cooperates with the float bore to provide an initial securing of the stem. The tapered portion of the stem terminates at a shoulder which provides a positioning reference for the float member. The float member may be permanently secured to the stem in the precisely positioned condition.

Other objects, details, uses and advantages of this invention will become apparent as the following description of the exemplary embodiment thereof presented in the accompanying drawings proceeds.

BRIEF DESCRIPTION OF THE DRAWINGS

The accompanying drawings show a present exemplary embodiment of this invention in which.

DESCRIPTION OF ILLUSTRATED EMBODIMENT

Figure 1:
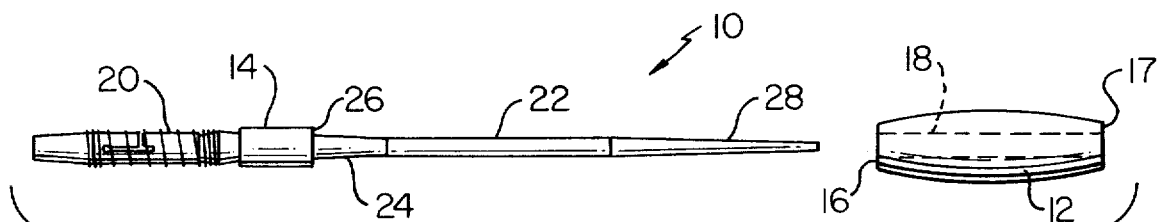
FIG. 1 is an exploded view of the fishing float of this invention.
Figure 2:
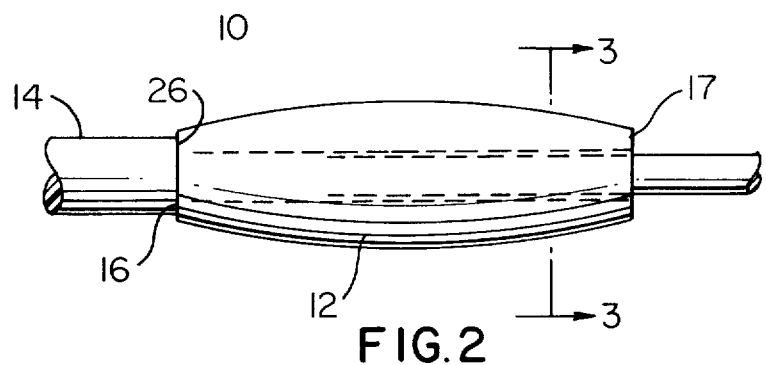
FIG. 2 is an elevational view of the assembled float.

Reference is now made to FIGS. 1 and 2 of the drawings which illustrate one exemplary embodiment of the fishing float of this invention, which is designated generally by the reference numeral 10. The fishing float 10 is comprised of a float body or member 12 and a stem or shaft 14.

For illustrative purposes only, the float member 12 is shown as an elongated type member. It is obvious that the float member may take on any configuration such as being round, egg-shaped, or the like. The float member 12 is formed with an internal bore 18 extending therethrough. The bore 18 is of a constant and uniform diameter. The ends of the bore 18 terminate at respective positioning faces 16 and 17 of the float member 12. The positioning faces 16 and 17 of the float member 12 are parallel to one another and at right angles to the axis of the bore 18. The float member may be formed of any suitable material such as balsa, cork, polystyrene foam, or the like. As will be explained hereinbelow, it is necessary that the material slightly give as the fishing float is assembled.

The stem 14 is seen to extend beyond the ends of the float member 12. One end 20 of the stem 14 is formed with any suitable line attaching means wherein the fishing float 10 may be secured to the fishing line. The means 20 illustrated herein are more fully described in United States Patent Application of Vernon J. Schneider filed July 13, 1972 Ser. No. 271,288, now issued as U.S. Pat. No. 3,866,346, ]nd assigned to the assignee of the present invention. The description of said means 20 9eferenced in said earlier application is incorporated herein by reference as though set forth herein.

The stem 14 is formed with an intermediate portion 22 which has a uniform and constant diameter. The diameter of portion 22 is slightly less than the internal diameter of the bore 18 of the float member 12. A tapered portion 24 extends from one end of the intermediate portion 22 and terminates at shoulder 26. The tapered portion 24 extends outwardly at a uniform rate and at the shoulder 26 and the tapered portion of the stem 14 is slightly larger than the internal diameter of the bore 18. The outer end of the intermediate portion 22 may extend outwardly in a decreasing taper 28.

Figure 3:
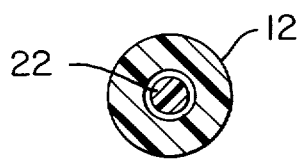
FIG. 3 is a sectional view taken along lines 3—3 of FIG. 2.
Figure 4:
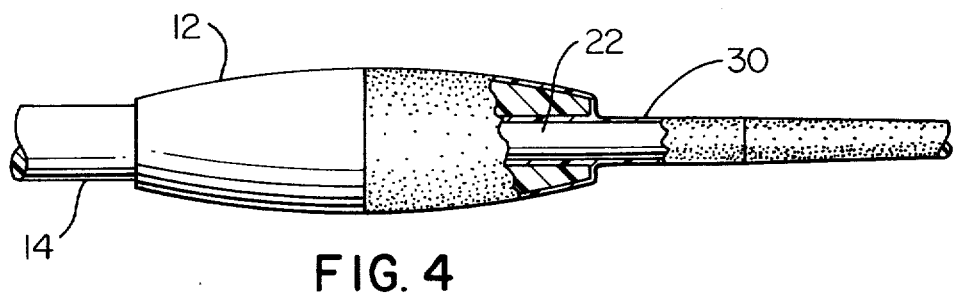
FIG. 4 is an elevational view partially broken away to show the results of the dip step in assembly.

In assembling the fishing float together, the tapered end 28 of the stem 14 is inserted into the bore 18 of the float member 12. The float member 12 is urged along the intermediate portion 22 until the bore 18 engages the tapered portion 24 having the same diameter. Continued relative movement of the float member 12 along the stem 14 will cause a slight giving of the material of float member 12 as a tight press fit is made. The float member 12 is urged axially along the stem 14 until one positioning face 16 engages the shoulder 26 of the stem 14. At this point, a tight press fit exists due to the cooperative engagement of the tapered portion 24 with the internal diameter of the bore 18. Even though a tight press fit is present at this point, a reverse force applied against the float member 12 or stem 14 will cause the members to become separated. This situation is unacceptable for fishing use, therefore, the float must be secured to the stem. This securing may be accomplished by dipping the fishing float 10 in a suitable bonding material such as paint, or the like 30. As seen in FIGS. 3 and 4, there is a slight clearance existing between the outer diameter of the intermediate portion 22 and the inner diameter of bore 18. Thus, when the fishing float 10 is dipped in the bonding material 30, some of the material will seep into the clearance between the members. When the material 30 has dried, a uniform coat of the material extends from a portion of the float member 12 down to the stem 14 and including the amount that has seeped into the clearance between the members. The material 30 will thereby provide a tight bonding of the float member 12 to the stem 14 in the proper position since the positioning face is in abutting relationship to the shoulder 26.

It can be seen that the fishing float hereinabove described is of simple and economical construction, is easily assembled and during the assembly steps the float member is precisely positioned along the stem. Accordingly, the objectives hereinbefore set forth have been accomplished.

While a present exemplary embodiment of this invention has been illustrated and described, it will be recognized that this invention may be otherwise variously embodied and practiced by those skilled in the art.

What is claimed is:

1. A fishing float comprising a float member having a bore extending therethrough and being formed with positioning faces at each end of said bore, said faces being transverse to the axis of said bore, said bore being of uniform diameter; a stem insertable through said float bore and being formed with a shoulder transverse to the axis of said stem, said shoulder and one positioning face being in abutting relationship one to the other to precisely position said float member relative to said stem, an intermediate portion on said stem having an outer diameter slightly less than the internal diameter of said float member bore, and an outwardly flaring 3apered portion extending from one end of said intermediate portion to said stem shoulder, the diameter of the tapered portion at the shoulder end being slightly larger than the float member bore wherein a press fit exists between said float member and said stem when said float member is positioned against said shoulder; securing means for securing said float member to said stem; and line securing means on said stem for attaching the fishing float to a fishing line.

2. The fishing float as set forth in claim 1 in which a slight annular clearance exists between the intermediate portion of said stem and the internal diameter of said float member bore at the nonabutting face and in which said securing means further comprises a bonding material applied to said float member and stem at the nonabutting face wherein said bonding material seeps into said clearance area thereby providing a permanent bond between said float member and said stem.

3. The method of assembling a fishing float including an elongated stem having an intermediate portion of uniform diameter, an outwardly flaring tapered portion extending from one end of said intermediate portion to a shoulder and a float member having a bore therethrough with a uniform diameter slightly greater than the diameter of said intermediate portion but less than the diameter of the tapered portion at the shoulder and the steps comprising inserting said stem therethrough said float member bore, relatively moving said float member along said uniform portion of said stem to said tapered portion, and urging said float member along said tapered portion until one end of said float member engages said shoulder in abutting relationship wherein said float member internal bore is slightly deformed by said tapered portion thereby providing a press fit to initially secure said float member to said stem member in a precisely positioned condition.

4. The method as set forth in claim 3 comprising the further step of securing in a nonremovable ashion said member to said stem.

5. The method as set forth in claim 4 in which said securing step comprises dipping the end of said stem and a portion of said float member in a bonding material wherein said material will seep into the clearance between said float member bore and said stem intermediate portion to provide a permanent bond therebetween.

* * * * *